United States Patent
Le et al.

(10) Patent No.: US 10,381,032 B2
(45) Date of Patent: Aug. 13, 2019

(54) MAGNETIC SENSORS WITH EFFECTIVELY SHAPED SIDE SHIELDS

(71) Applicant: Western Digital Technologies, Inc., San Jose, CA (US)

(72) Inventors: Quang Le, San Jose, CA (US);
Yongchul Ahn, San Jose, CA (US);
Xiaoyong Liu, San Jose, CA (US);
Jui-Lung Li, San Jose, CA (US);
Hongquan Jiang, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 0 days.

(21) Appl. No.: 15/870,779

(22) Filed: Jan. 12, 2018

(65) Prior Publication Data

US 2019/0221232 A1    Jul. 18, 2019

(51) Int. Cl.
*G11B 5/39* (2006.01)
*G11B 5/60* (2006.01)
*G11B 5/10* (2006.01)

(52) U.S. Cl.
CPC .............. *G11B 5/6082* (2013.01); *G11B 5/10* (2013.01); *G11B 5/3906* (2013.01); *G11B 5/3909* (2013.01); *G11B 5/3912* (2013.01); *G11B 5/3932* (2013.01)

(58) Field of Classification Search
CPC ... G11B 5/3906; G11B 5/3909; G11B 5/3912; G11B 5/3932
USPC .................... 360/319, 324.11, 324.12, 324.2
See application file for complete search history.

(56) References Cited

U.S. PATENT DOCUMENTS

| | | | |
|---|---|---|---|
| 6,473,279 B2 | 10/2002 | Smith et al. |
| 7,360,296 B2 | 4/2008 | Cyrille et al. |
| 7,467,459 B2 | 12/2008 | Gill et al. |
| 7,961,437 B2 | 6/2011 | Seagle |
| 8,419,954 B1 | 4/2013 | Chen et al. |
| 8,559,140 B2 | 10/2013 | Gao |
| 8,630,068 B1 | 1/2014 | Mauri et al. |
| 8,922,954 B2 | 12/2014 | Cao et al. |
| 8,941,954 B2 | 1/2015 | Le et al. |

(Continued)

OTHER PUBLICATIONS

Zheng et al., "Side Shielded TMR Reader with Track-Width-Reduction Scheme", (2006) Magnetics, IEEE Transactions on. 42. 2303-2305. 10.1109/TMAG.2006.880463; https://www.researchgate.net/publication/3112184_Side_Shielded_TMR_Reader_with_Track-Width-Reduction_Scheme; 4 pages.

*Primary Examiner* — Jefferson A Evans
(74) *Attorney, Agent, or Firm* — Loza & Loza, LLP; Gabriel Fitch (57) ABSTRACT

Magnetic sensors with effectively shaped side shields and their fabrication processes are provided. One such sensor includes a substrate, a sensor stack disposed on the substrate and having a stripe height, where the sensor stack further includes a front edge disposed at an air bearing surface (ABS) of the magnetic sensor, a back edge opposite of the front edge, and two side edges, and a side shield adjacent to each of the two side edges of the sensor stack, each side shield having a side shield height defined as a distance from the ABS to a back edge of the side shields, where the side shield height is greater than the stripe height, and where substantially no residue from materials used to form the side shield are disposed at the back edge of the sensor stack.

7 Claims, 12 Drawing Sheets

(56) References Cited

U.S. PATENT DOCUMENTS

| | | | |
|---|---|---|---|
| 9,076,468 B1 * | 7/2015 | Keener | G11B 5/3932 |
| 9,099,122 B2 | 8/2015 | Jiang et al. | |
| 9,123,886 B2 | 9/2015 | Zhang et al. | |
| 9,230,576 B1 | 1/2016 | Gill et al. | |
| 9,390,735 B1 | 7/2016 | Wang et al. | |
| 9,513,349 B2 * | 12/2016 | Gill | G11B 5/3912 |
| 9,520,147 B2 | 12/2016 | Zhou et al. | |
| 9,886,974 B2 * | 2/2018 | Stokes | G11B 5/3912 |
| 2007/0206333 A1 * | 9/2007 | Watanabe | G11B 5/3163 |
| | | | 360/313 |
| 2011/0007426 A1 * | 1/2011 | Qiu | G11B 5/3932 |
| | | | 360/313 |
| 2016/0163338 A1 * | 6/2016 | Ho | G11B 5/3932 |
| | | | 360/75 |
| 2017/0125046 A1 * | 5/2017 | Stokes | G11B 5/3912 |

* cited by examiner

MAGNETIC SENSORS WITH EFFECTIVELY SHAPED SIDE SHIELDS

FIELD

The present invention relates to magnetic data recording, and more particularly to magnetic sensors with effectively shaped side shields and their fabrication processes.

INTRODUCTION

Computer systems commonly include an information storage device that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected tracks on the rotating disk. The read and write heads are directly located on a slider that has an air bearing surface (ABS). The suspension arm biases the slider into contact with the surface of the disk when the disk is not rotating, but when the disk rotates air is swirled by the rotating disk. When the slider rides on the air bearing surface, the write and read heads are employed for writing magnetic impressions to and reading magnetic impressions from the rotating disk. The read and write heads are connected to processing circuitry that operates according to a computer program to implement the reading and writing functions.

The write head generally includes at least one coil, a write pole and one or more return poles. When current flows through the coil, a resulting magnetic field causes a magnetic flux to flow through the write pole, which results in a magnetic write field emitting from the tip of the write pole. This magnetic field is sufficiently strong that it locally magnetizes a portion of the adjacent magnetic media, thereby recording a bit of data. The write field then travels through a magnetically soft under-layer of the magnetic medium to return to the return pole of the write head.

Magnetoresistive sensors such as a Giant Magnetoresistive (GMR) sensors, Tunnel Junction Magnetoresistive (TMR) sensors or a scissor type magnetoresistive sensors have been employed in read heads to read a magnetic signal from the magnetic media. Such a magnetoresistive sensor has an electrical resistance that changes in response to an external magnetic field. This change in electrical resistance can be detected by processing circuitry in order to read magnetic data from the magnetic media.

The build processes for fabricating a read head typically involves one of two possible build schemes. One such scheme, which may be referred to as K3 first, involves patterning a stripe height of the sensor first before forming other read head components. The second such build scheme, which may be referred to as K5 first, involves patterning a track width of the sensor first before forming other read head components. However, these build schemes have a number of disadvantages that do not allow for the formation/shaping of effective side shields, particularly in the case of smaller geometries associated with modern read heads configured for high density magnetic recording.

SUMMARY

In one aspect, the disclosure relates to a magnetic sensor including a substrate, a sensor stack disposed on the substrate and having a stripe height, where the sensor stack further includes a front edge disposed at an air bearing surface (ABS) of the magnetic sensor, a back edge opposite of the front edge, and two side edges, and a side shield adjacent to each of the two side edges of the sensor stack, each side shield having a side shield height defined as a distance from the ABS to a back edge of the side shields, where the side shield height is greater than the stripe height, and where substantially no residue from materials used to form the side shield are disposed at the back edge of the sensor stack.

In another aspect, the disclosure relates to a method of fabricating a magnetic sensor having an air bearing surface (ABS), including depositing sensor materials on a substrate, shaping the sensor materials to form a stripe height of the magnetic sensor, shaping the sensor materials to form a track width of the magnetic sensor, depositing side shield materials on the shaped sensor materials, shaping the side shield materials such that a resulting side shield extends further than the stripe height, depositing an insulator layer on the shaped side shield materials, and shaping the insulator layer.

DETAILED DESCRIPTION

As described above, reader designs in general consist of two types of build schemes (K5 first, K3 first), whereby either the stripe height is formed first (K3 first) or after the track-width (K5 first). Each scheme has advantages and disadvantages. For instance, the K5 first build scheme offers advantages such as side shield shaping and narrow track-width but has major disadvantages such as side shield residuals, poor refill uniformity, and free layer tails that can affect performance and reliability. On the other hand, the K3 first build scheme offers advantages such as pinned layer shaping and uniform refill, but has disadvantages such as side shields that extend to the pinned layer, no side shield shaping, and lack of narrow track-width for the sensor.

These disadvantages can negatively affect self-servo writing and other performance (e.g., resolution, tracks per inch).

As the need to achieve increased areal density has become more important for magnetic storage, the inventors sought methods to harvest the advantages of both the K3 first and K5 first build schemes. In this disclosure, a novel read head (e.g., magnetic sensor) with effectively shaped side shields and a method of fabricating the read head/sensor are proposed that incorporate the advantages of both the K5 first and K3 first build schemes. In one aspect, the methods disclosed herein can involve shaping the side shields after shaping the stripe height of the sensor. In related art approaches, such as the K5 first build scheme, the side shields may be shaped at the same time as the stripe height, or not shaped at all as in the case of the K3 build scheme. As a result of the fabrication method disclosed herein, the resulting magnetic sensors can have a side shield height that is greater than the stripe height. In addition, the resulting magnetic sensors can have substantially no residue at the back edge of the sensor stack from the materials used to form the side shield. These features provide improved sensor performance.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

Figure 1:
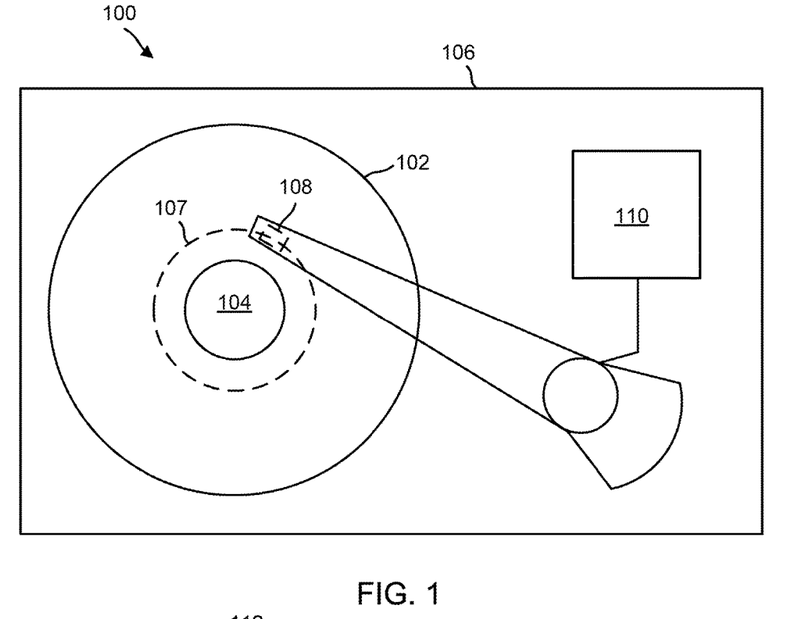
FIG. 1 is a top schematic view of a disk drive configured for heat assisted magnetic recording (HAMR) including a magnetic sensor with effectively shaped side shields in accordance with one embodiment of the disclosure.

FIG. 1 is a top schematic view of a disk drive 100 configured for heat assisted magnetic recording (HAMR) including a magnetic sensor with effectively shaped side shields in accordance with one embodiment of the disclosure. The laser (not visible in FIG. 1 but see 114 in FIG. 2) is positioned with a head/slider 108. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In an alternative embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track 107. The position of head 108 relative to disk 102 may be controlled by position control circuitry 110.

Figure 2:
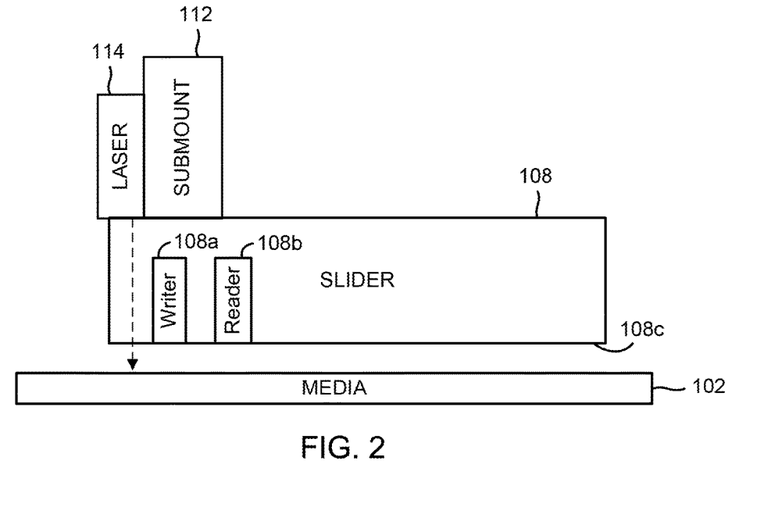
FIG. 2 is a side schematic view of the slider and HAMR magnetic medium of FIG. 1 where the slider includes the magnetic sensor/reader with effectively shaped side shields in accordance with one embodiment of the disclosure.

FIG. 2 is a side schematic view of the slider and HAMR magnetic medium of FIG. 1 where the slider includes the magnetic sensor/reader with effectively shaped side shields in accordance with one embodiment of the disclosure. The HAMR system components also include a sub-mount 112 attached to a top surface of the slider 108. The laser 114 is attached to the sub-mount 112, and possibly to the slider 108. The slider 108 includes the write element (e.g., writer) 108a and the read element (e.g., reader or magnetic sensor) 108b positioned along an air bearing surface (ABS) 108c of the slider for writing information to, and reading information from, respectively, the media 102.

In operation, the laser 114 is configured to generate and direct light energy to a waveguide (possibly along the dashed line) in the slider which directs the light to a near field transducer (NFT) near the air bearing surface (e.g., bottom surface) 108c of the slider 108. Upon receiving the light from the laser 114 via the waveguide, the NFT generates localized heat energy that heats a portion of the media 102 near the write element 108a. FIGS. 1 and 2 illustrate a specific embodiment of a HAMR system. In other embodiments, the magnetic sensors with effectively shaped side shields and the corresponding fabrication processes disclosed herein can be used with other HAMR storage systems or with non-HAMR storage systems.

Figure 3:
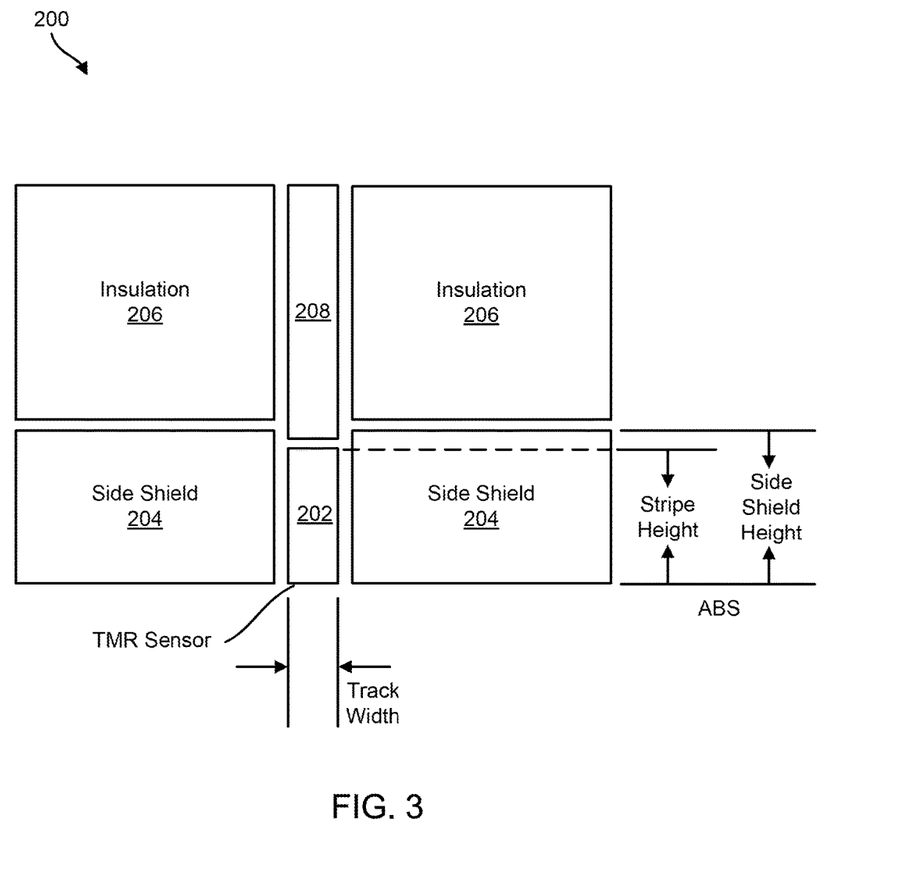
FIG. 3 is top schematic view of a magnetic sensor with effectively shaped side shields in accordance with one embodiment of the disclosure.

FIG. 3 is top schematic view of a magnetic sensor 200 with effectively shaped side shields 204 in accordance with one embodiment of the disclosure. The magnetic sensor 200 further includes a sensor stack 202, insulation layers 206, and a pinned layer (e.g., anti-parallel pinned layer extension) 208. The sensor stack 202 has a width that defines a track width of the magnetic sensor 200, and a length/height to the ABS that defines a stripe height (SH) of the magnetic sensor 200. As is illustrated in FIG. 3, a height of the side shield 204 to the ABS is slightly greater than the stripe height. As also illustrated in FIG. 3, no side shield residuals exist directly behind the back edge (e.g., edge opposite the ABS edge) of the sensor stack 202. These desirable features enhance sensor performance and are formed during the fabrication processed that are described below.

In a K3 first read head, and in contrast to the improved magnetic sensor 200 of FIG. 3, the side shields may extend as far as the pinned layer extension 208. In a K5 first read head, and in contrast to the improved magnetic sensor 200 of FIG. 3, the side shields may extend only as far as the height of the sensor stack 202. The other limitations of the K3 first and K5 first build schemes are described above.

Figure 4:
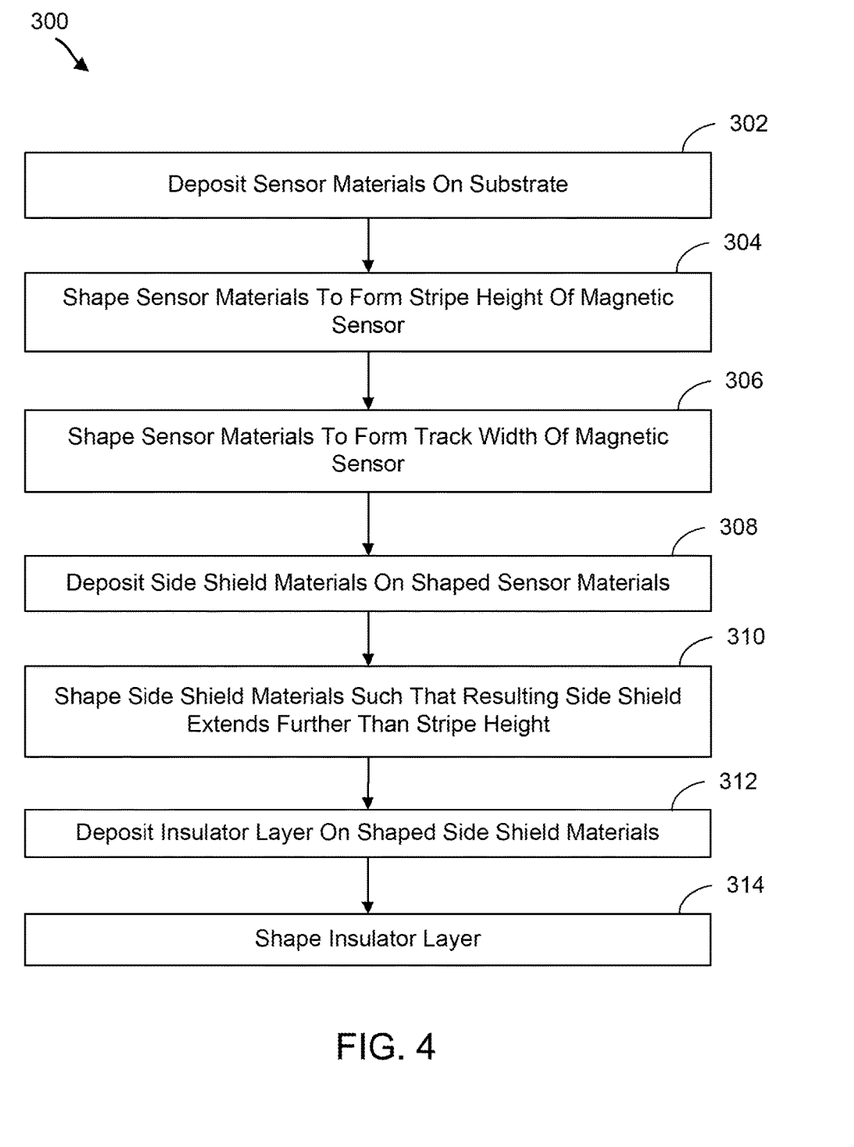
FIG. 4 is a flowchart of a process for fabricating a magnetic sensor with effectively shaped side shields in accordance with one embodiment of the disclosure.

FIG. 4 is a flowchart of a process 300 for fabricating a magnetic sensor with effectively shaped side shields in accordance with one embodiment of the disclosure. In one aspect, process 300 may be used to fabricate the magnetic sensor 200 of FIG. 3, or any of the other magnetic sensors with effectively shaped side shields disclosed herein. In block 302, the process deposits sensor materials on a substrate. In one aspect, the sensor materials include materials for a sensor stack. In one aspect, the sensor stack may include a pinned layer, a barrier layer, a free layer, capping layer and/or other layers commonly included in a tunnel magnetoresistance (TMR) reader stack. In one aspect, the sensor stack may have a stacked structure that includes a pinned layer on a lower shield, a barrier layer on the pinned layer, a free layer on the barrier layer, and a capping layer on the free layer. In other aspects, other reader structures including the same or similar layers, and/or additional layers, or even fewer layers, may be used for the sensor stack materials.

In block 304, the process shapes the sensor materials to form a stripe height of the magnetic sensor. In one aspect, the shaping may include depositing and/or patterning a photoresist layer and a first masking layer (e.g., diamond like carbon or DLC masking layer), etching (e.g., reactive ion etching) the sensor materials and/or first DLC masking layer, milling the sensor materials, depositing an insulator layer, depositing/refilling DLC masking materials (e.g., depositing a second DLC mask), and planarizing the workpiece (e.g., using chemical mechanical polishing or CMP). The shaping sub-processes/actions are described in more detail below.

In block 306, the process shapes the sensor materials to form a track width of the magnetic sensor. In one aspect, the shaping may include depositing and/or patterning a third DLC mask on the sensor stack and a second insulator layer, milling the sensor materials, and/or depositing a fourth mask (e.g., SiN). The shaping sub-processes/actions are described in more detail below.

In block 308, the process deposits side shield materials on the shaped sensor materials. In one aspect, the process deposits the side shield materials after depositing and patterning (e.g., etching using reactive ion etching or other suitable etching technique) a second photoresist layer. In one aspect, the process further deposits a fourth DLC mask layer on the side shield materials. In one aspect, the second photoresist layer and/or fourth DLC mask defines a resulting height the side shield will have. The sub-processes/actions of block 308 are described in more detail below.

In block 310, the process shapes the side shield materials such that a resulting side shield extends further than the stripe height. In one aspect, the shaping may include removing the second resist layer and selected portions of the fourth DLC mask (e.g., those portions on the second resist layer). In one aspect, the depositing and shaping the side shield materials is performed after the process shapes the sensor materials to form the track width. The sub-processes/actions of this paragraph are described in more detail below.

In block 312, the process deposits an insulator layer on the shaped side shield materials. In one aspect, the process deposits the insulator layer after depositing and patterning (e.g., etching using reactive ion etching or other suitable etching technique) a third photoresist layer, which may be referred to as a L7 layer/mask. The sub-processes/actions of this paragraph are described in more detail below.

In block 314, the process shapes the insulator layer. In one aspect, the shaping may include removing the third photoresist layer (L7 mask) and planarizing the workpiece. In one aspect, the process may further include further planarizing the workpiece, depositing a fourth resist, and milling portions of the side shield layer, the insulator layer, and/or a pinned layer of the sensor stack. The sub-processes/actions of this paragraph are described in more detail below.

In one aspect, and in addition the layers described above, other layers commonly included in a sensor stack configured for magnetic recording may also be deposited and shaped during the process.

In one embodiment, the process can perform the sequence of actions in a different order. In another embodiment, the process can skip one or more of the actions. In other embodiments, one or more of the actions are performed simultaneously. In some embodiments, additional actions can be performed.

FIGS. 5a to 5k illustrate a process 400 for fabricating a magnetic sensor with effectively shaped side shields in accordance with one embodiment of the disclosure. These figures illustrate a flowchart of process actions on the left side and the corresponding structures of the magnetic sensor (e.g., workpiece) on the right side. In one aspect, process 400 may be used to fabricate the magnetic sensor 200 of FIG. 3, or any of the magnetic sensors with effectively shaped side shields disclosed herein.

Figures 5A, 5B:
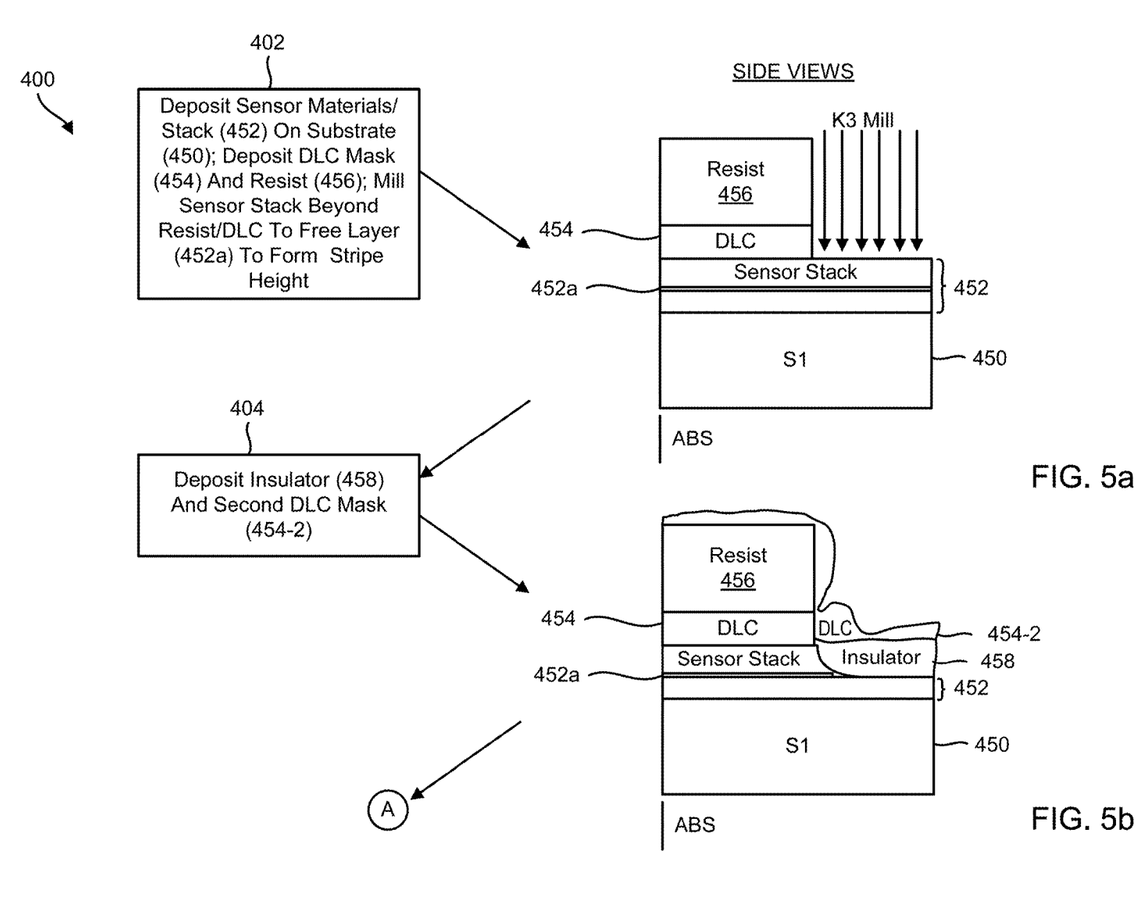
FIGS. 5a to 5k illustrate a process for fabricating a magnetic sensor with effectively shaped side shields in accordance with one embodiment of the disclosure.

FIG. 5a illustrates block 402 of process 400 and a side view of the workpiece. In block 402, the process deposits sensor materials (e.g., materials for the sensor stack) 452 on a substrate (e.g., a magnetic bottom shield or S1) 450, deposits a first DLC mask 454 and first photo resist 456 on the sensor materials 452, mills the sensor stack 452 in the area beyond the first resist 456 and first DLC mask 454 to a free layer 452a of the sensor stack 452. In one aspect, the milling action defines a stripe height of the sensor stack 452, and the entire magnetic sensor. This milling also defines a back edge of sensor stack 452. In one aspect, the process also patterns the first DLC mask 454 and first photo resist 456 just after they have been deposited.

In one aspect, the sensor stack may include a pinned layer, a barrier layer, the free layer 452a, capping layer and/or other layers commonly included in a tunnel magnetoresistance (TMR) reader stack. In one aspect, the sensor stack may include a pinned layer on a lower shield 450, a barrier layer on the pinned layer, a free layer 452a on the barrier layer, and a capping layer on the free layer 452a. In other aspects, other reader structures including the same or similar layers, and/or additional layers, may be used for the sensor stack materials. In one aspect, the pinned layer may be made of CoFe, CoFeB, and/or other suitable materials. In one aspect, the barrier layer may be made of MgO or other suitable materials. In one aspect, the free layer may be made of NiFe, CoFeB, and/or other suitable materials. In one aspect, the free layer may be made of a bi-layer including a first layer of NiFe and a second layer of CoFeB. In one aspect, the DLC mask 454 can have a thickness of about 10 nanometers (nm).

In FIG. 5a, the magnetic sensor or workpiece is shown with a side view such that an air bearing surface (ABS) of the sensor is along the left edge of the workpiece.

FIG. 5b illustrates block 404 of process 400 and a side view of the workpiece. In block 404, the process deposits a first insulator layer 458 on the sensor stack 452 and a second DLC mask 454-2 on the first insulator layer 458 and resist 456.

Figure 5C:
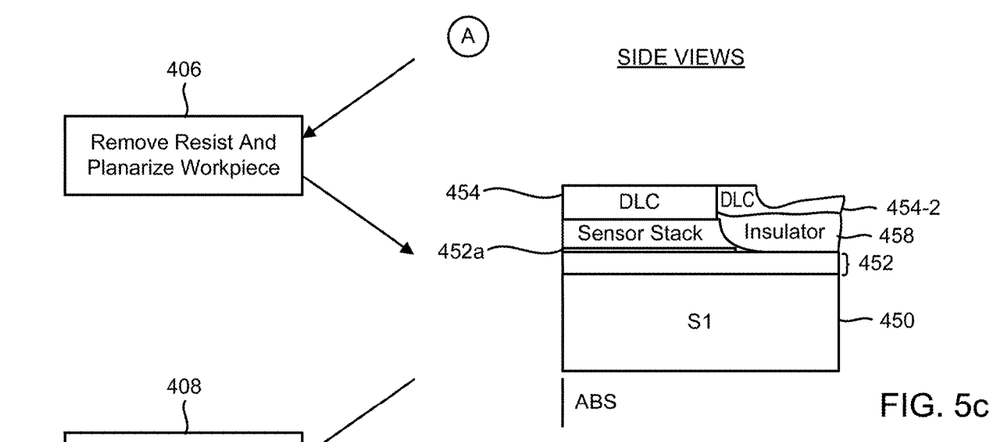

FIG. 5c illustrates block 406 of process 400 and a side view of the workpiece. In block 406, the process removes the first resist 456 and planarizes the workpiece (e.g., using chemical mechanical polishing).

Figure 5D:
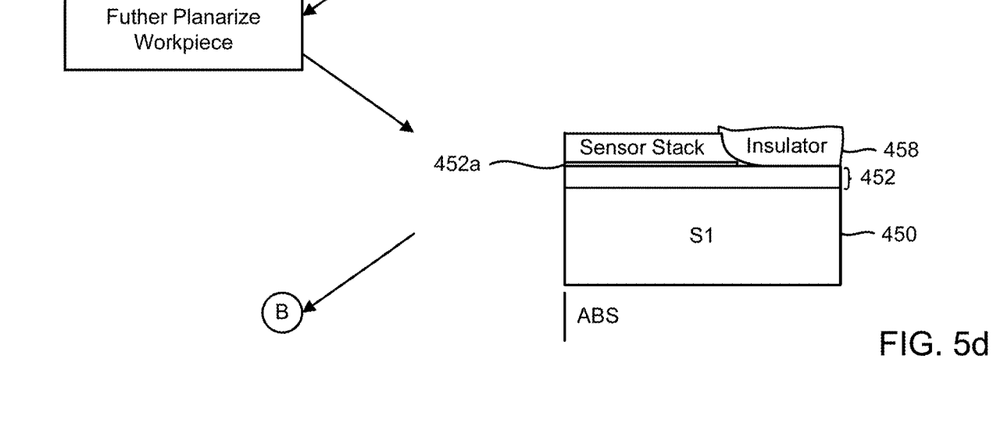

FIG. 5d illustrates block 408 of process 400 and a side view of the workpiece. In block 408, the process further planarizes the workpiece such that the first DLC mask 454 and second DLC mask 454-2 are completely or substantially removed.

Figure 5E:
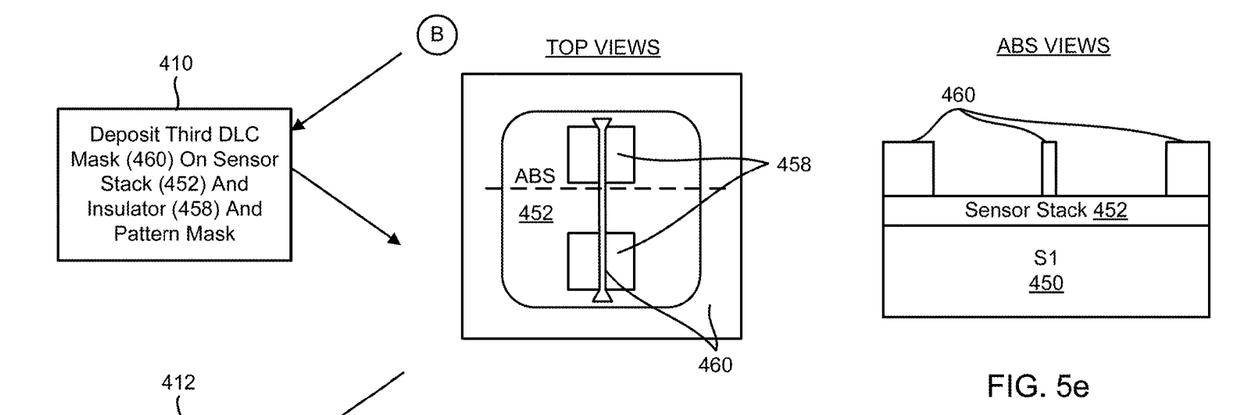

FIG. 5e illustrates block 410 of process 400 and top and ABS views of the workpiece. In block 410, the process deposits a third DLC mask 460 on both the sensor stack 452 and the first insulator 458, and patterns the third DLC mask 460. In one aspect, the middle or dumbbell portion of the third DLC mask 460 may be used to define a track width of the sensor stack 452.

Figure 5F:
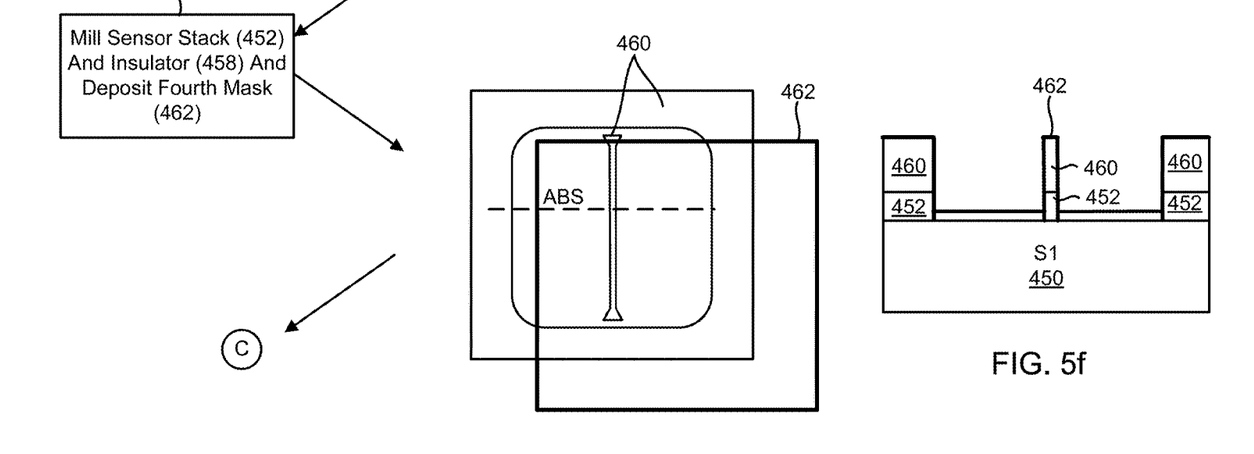

FIG. 5f illustrates block 412 of process 400 and top and ABS views of the workpiece. In block 412, the process mills the sensor stack 452 (in the areas not protected by the third DLC mask 460 and first insulator 458) and deposits a fourth mask 462.

Figure 5G:
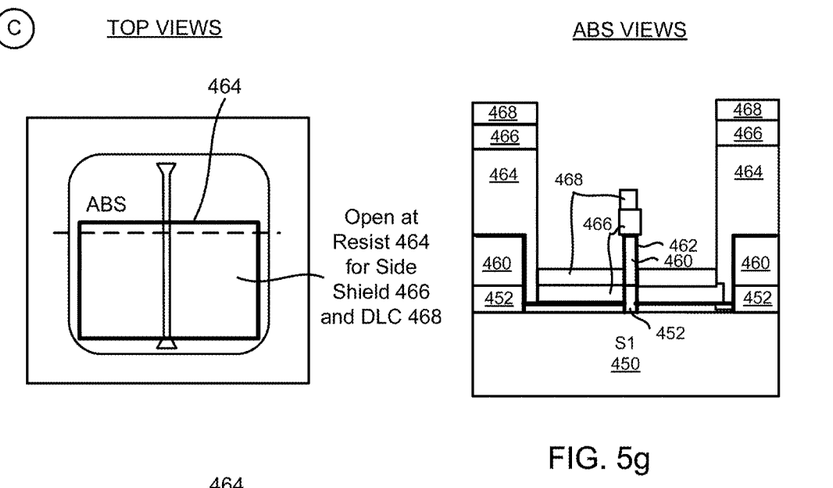

FIG. 5g illustrates block 414 of process 400 and top and ABS views of the workpiece. In block 414, the process deposits and patterns a second photo resist 464, and deposits side shield materials 466 and a fifth DLC mask 468. In one aspect, the second photo resist 464 is used to define a shape of the side shield materials (e.g., side shields) 466. In one aspect, the fifth DLC mask 468 can be used to protect against certain future planarization actions (e.g., to protect side shield materials 466 against future CMP).

In one aspect, the soft bias layers (e.g., the resulting layers formed from the side shield materials) can be constructed of a single layer, bi-layer, or multilayer of soft magnetic material such as NiFe19, NiFe4, NiFe19/NiFe4, NiFe4/NiFe19, NiFe17Mo5, NiFe55, NiFe19/NiFeMo, NiFeMo/NiFe19, CoFe25, or their alloys or a combination thereof, thereby allowing the bias layers (e.g., side shield layers 466) to function as side magnetic shields as well as provide a magnetic biasing function for biasing the free layer 452a. In one aspect, the side shield materials 466 can be made of hard bias materials such as CoPt, CoPtCr, and/or other suitable materials.

Figure 5H:
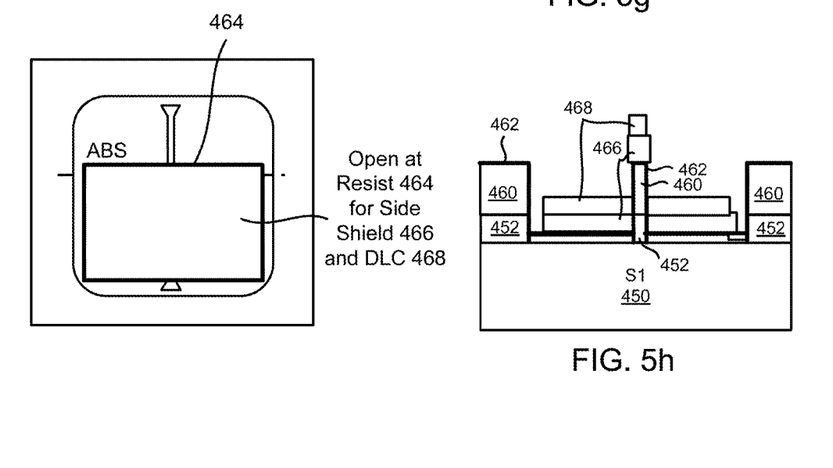

FIG. 5h illustrates block 416 of process 400 and top and ABS views of the workpiece. In block 416, the process removes the second photo resist 464 and any layers above said resist (e.g., those portions of the side shield materials 466 and fifth DLC mask 468 on the second resist 464).

Figure 5I:
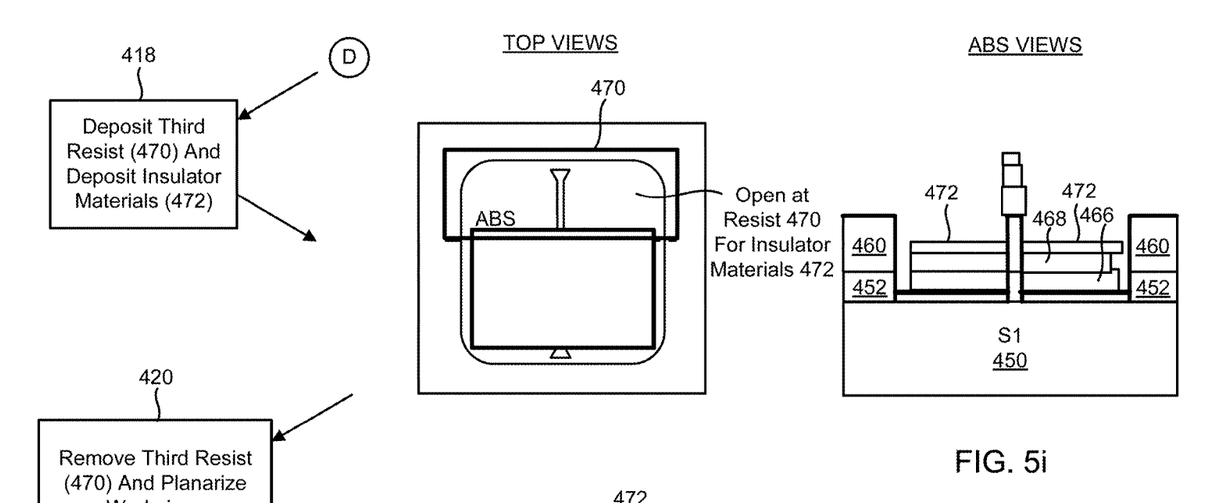

FIG. 5i illustrates block 418 of process 400 and top and ABS views of the workpiece. In block 418, the process deposits and patterns a third photo resist 470, and deposits insulator materials 472 (e.g., a second insulator layer 472). In one aspect, the third photo resist 470 (visible in the top view but not in the ABS view as resist 470 is open there) can be used to define a shape of the insulator materials (e.g., resulting in insulator layer 206 in FIG. 2) 472.

In one aspect, the insulator materials 472 may be made of TaOx, $Al_2O_3$, MgO, SiOx, SiNx, SiOxNy, and/or other suitable materials, where x and y are positive integers.

Figure 5J:
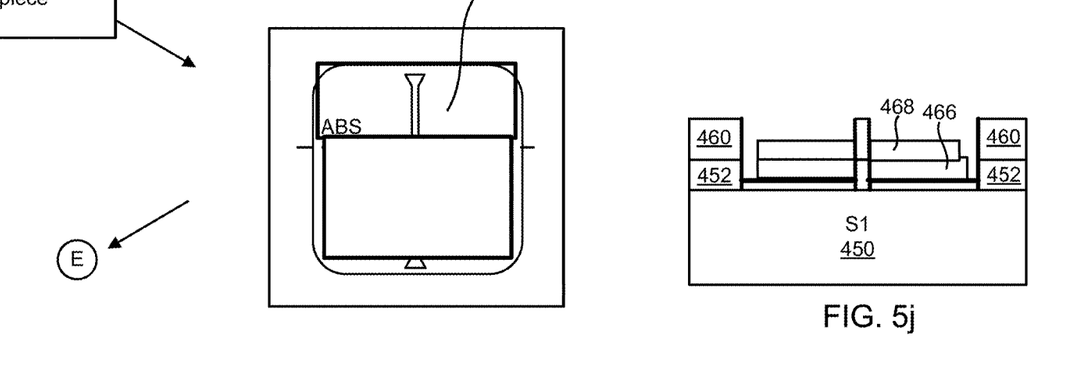

FIG. 5j illustrates block 420 of process 400 and top and ABS views of the workpiece. In block 420, the process removes the third resist 470 and planarizes the workpiece. In one aspect, the insulator materials 472 have been removed from the workpiece at the ABS but remain in areas behind the ABS. In one aspect, this removal may be performed using resist liftoff, CMP, reactive ion etching and/or other suitable material removal processes.

Figure 5K:
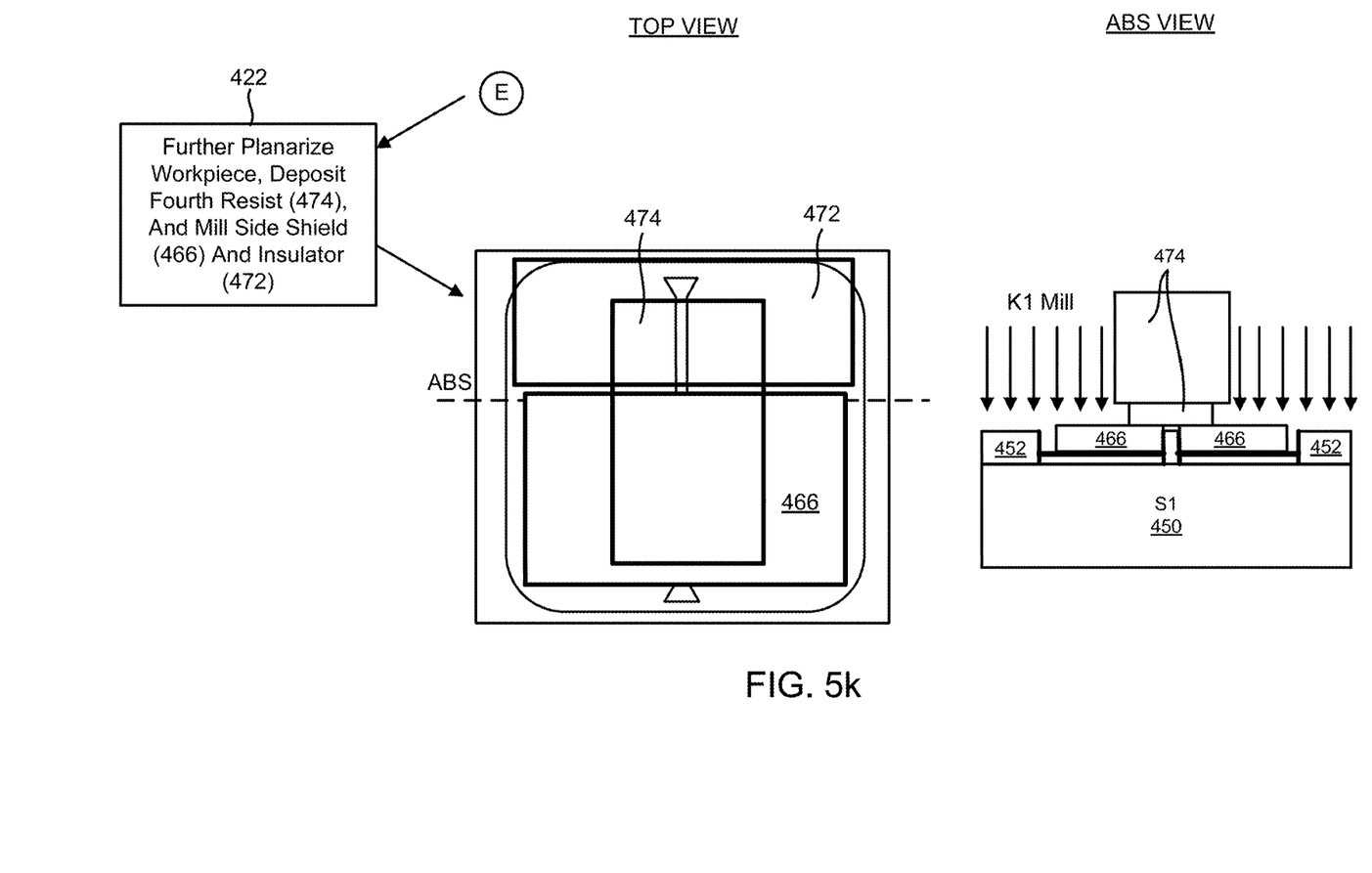

FIG. 5k illustrates block 422 of process 400 and top and ABS views of the workpiece. In block 422, the process further planarizes the workpiece (e.g., thereby removing all or substantially all of the third DLC mask 460), deposits a fourth photo resist 474, and mills the side shield 466 and insulator 472. In one aspect, this milling further defines the shape of the side shields and the insulator 472, and shapes a pinned layer of the sensor stack. This shaping may include shaping the extension of the anti-parallel pinned layer, such as the anti-parallel pinned layer extension 208 of FIG. 2.

In one aspect, and in addition the layers described above and depicted in FIGS. 5a to 5k, other layers commonly included in a sensor stack may also be deposited and shaped during the process.

As a result of this process 400, the resulting magnetic sensors can have a side shield height (e.g., preselected side shield height) that is greater than the stripe height. In addition, the resulting magnetic sensors can have substantially no residue at the back edge of the sensor stack from the materials used to form the side shield. These features provide improved sensor performance.

In several embodiments, the deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

In one embodiment, the process can perform the sequence of actions in a different order. In another embodiment, the process can skip one or more of the actions. In other embodiments, one or more of the actions are performed simultaneously. In some embodiments, additional actions can be performed.

In one aspect, the sensor fabrication methods of FIGS. 5a to 5k and/or FIG. 4 can be used to fabricate several different types of readers. These readers can include an antiparallel free layer (AP FL) type read head, a two dimensional shape enhanced pinning (2D SEP) type read head, a reduced interlayer coupling (Hf) type read head, and/or a scissor rear soft bias (SB) type read head. An example of an antiparallel free layer (AP FL) type read head may be found in U.S. Pat. No. 6,473,279 (e.g., see FIG. 3A), the entire content of which is hereby incorporated by reference. In one aspect, antiparallel free layer (AP FL) type read head may be characterized by an anti-parallel alignment between the magnetizations of the free layer (e.g., see 310 in FIG. 3A of U.S. Pat. No. 6,473,279) and an adjacent ferromagnetic layer (e.g., see 314 in FIG. 3A of U.S. Pat. No. 6,473,279). FIGS. 5a to 5k of the instant application show a two dimensional shape enhanced pinning (2D SEP) type read head. In one aspect, the two dimensional shape enhanced pinning (2D SEP) type read head may be characterized by an extended pin layer shaped in more than one dimension.

An example of a scissor rear soft bias (SB) type read head may be found in U.S. Pat. No. 9,099,122 (e.g., see FIGS. 4 and 5), the entire content of which is hereby incorporated by reference. In one aspect, the scissor rear soft bias (SB) type read head may be characterized by a sensor that uses only two magnetic free layers without additional pinning layers. The rear soft bias layer of U.S. Pat. No. 9,099,122 is shown as 402 in FIGS. 4 and 804 in FIG. 9, and as being behind the sensor stack with reference to the ABS. On a side note, the soft bias of this disclosure (e.g., at 208 in FIG. 3) may be positioned at the rear of the sensor stack and/or on the sides of the sensor stack.

An example of a reduced interlayer coupling (Hf) type read head may be found in U.S. Pat. No. 9,099,122 (e.g., see FIGS. 4, 5, 28, 29). In one aspect, the reduced interlayer coupling (Hf) type read head may be characterized by a reduction in the Hf between scissor sensor free layers (e.g., 304 and 306 in FIG. 3) brought about by an insulator layer (e.g., see 320 in FIG. 5 or insulator/dielectric 2502 in FIGS. 28/29) or insulator structure (e.g., see 402 in FIG. 5 or bias/soft bias layer 2504) positioned at the back edge of the sensor stack (e.g., see FIG. 5, 28, or 29), where component and figure references used in this sentence refer to U.S. Pat. No. 9,099,122.

Figure 6:
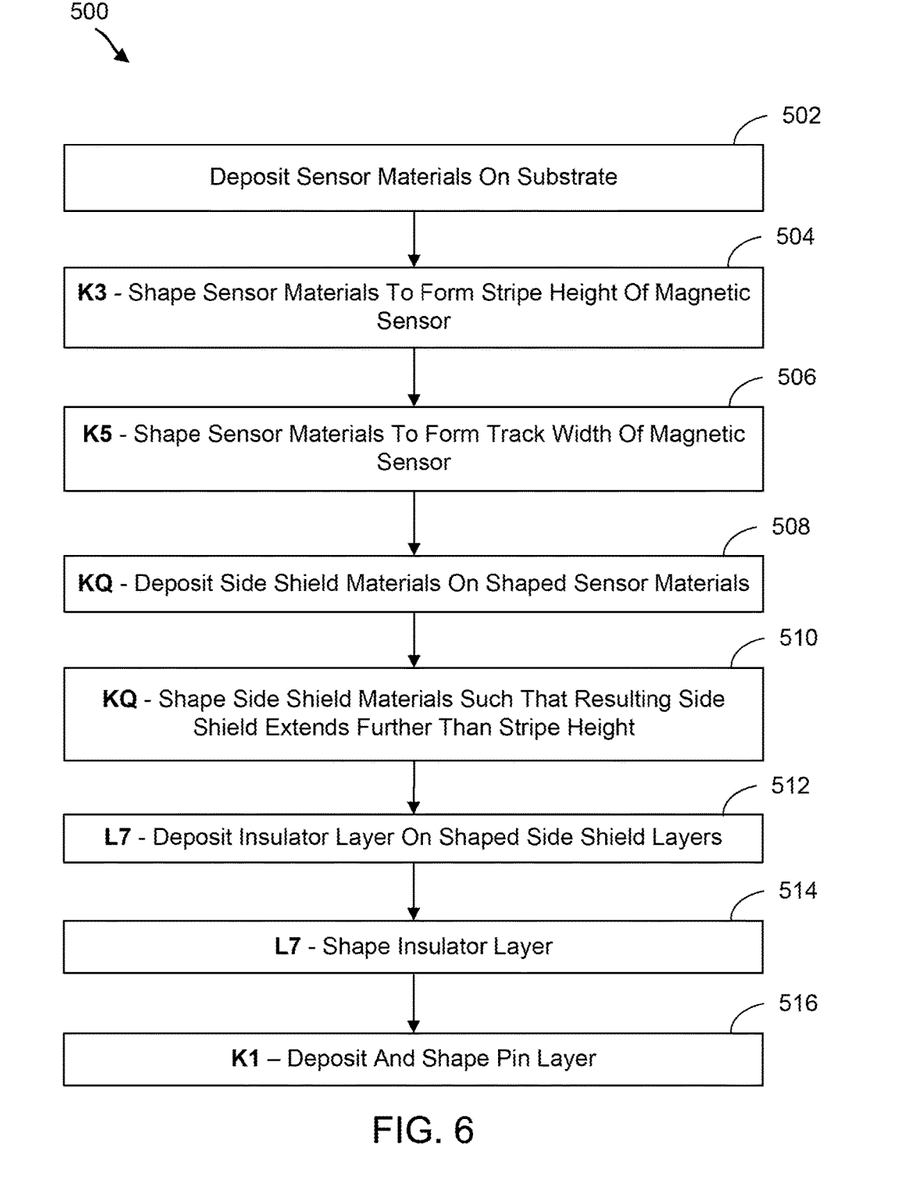
FIG. 6 is a flowchart of a second process for fabricating a magnetic sensor with effectively shaped side shields in accordance with one embodiment of the disclosure.

FIG. 6 is a flowchart of a second process 500 for fabricating a magnetic sensor with effectively shaped side shields in accordance with one embodiment of the disclosure. In one aspect, the process 500 is substantially similar to process 300 of FIG. 4 except that certain actions have been associated with the corresponding names of build schemes (e.g., K3, K5, K1) or masks (KQ, L7). In one aspect, process 500 may be used to fabricate the magnetic sensor 200 of FIG. 3, or any of the magnetic sensors with effectively shaped side shields disclosed herein.

In block 502, the process deposits sensor materials on a substrate.

In block 504, the process shapes the sensor materials to form a stripe height of the magnetic sensor. In one aspect, the deposition and shaping of the sensor materials to form a stripe height may be referred to as a K3 build scheme (e.g., corresponding to the actions of blocks 402 to 408), and may involve use of a K3 mask, which may be formed of resist (e.g., resist 456) and/or DLC (e.g., DLC 454 and DLC 454-2).

In block 506, the process shapes the sensor materials to form a track width of the magnetic sensor. In one aspect, the shaping of the sensor materials to form the track width may be referred to as a K5 build scheme (e.g., corresponding to the actions of blocks 410 and 412), and may involve use of a K5 mask, which may be formed of resist and/or DLC (e.g., DLC 460).

In block 508, the process deposits side shield materials (e.g., corresponding to the action of block 414) on the shaped sensor materials. In one aspect, the process deposits the side shield materials after depositing and patterning (e.g., etching using reactive ion etching or other suitable etching technique) a second photoresist layer. In one aspect, the process further deposits a fourth DLC mask layer on the side shield materials. In one aspect, the second photoresist layer and/or fourth DLC mask defines a resulting height the side shield will have. In one aspect, the second photo resist layer and/or fourth DLC mask may be referred to as a KQ mask.

In block 510, the process shapes the side shield materials (e.g., corresponding to the action of block 416) such that a resulting side shield extends further than the stripe height. In one aspect, the shaping may include removing the second resist layer and portions of the fourth DLC mask (e.g., those portions on the second resist layer).

In block 512, the process deposits an insulator layer (e.g., corresponding to the action of block 418) on the shaped side shield materials. In one aspect, the process deposits the insulator layer after depositing and patterning (e.g., etching using reactive ion etching or other suitable etching technique) a third photoresist layer, which may be referred to as a L7 layer/mask.

In block 514, the process shapes the insulator layer. In one aspect, the shaping may include removing the third photoresist layer (L7 mask) and planarizing the workpiece.

In block 516, the process deposits and shapes a pinned layer (e.g., corresponding to the action of block 422). In one aspect, the depositing may include depositing a fourth resist, and the shaping may include milling portions of the side shield layer, the insulator layer, and/or a pinned layer of the sensor stack. In one aspect, the shaping of the pinned layer may be referred to as a K1 build scheme (e.g., action of block 422), and may involve use of a K1 mask, which may be formed of resist.

Figure 7:
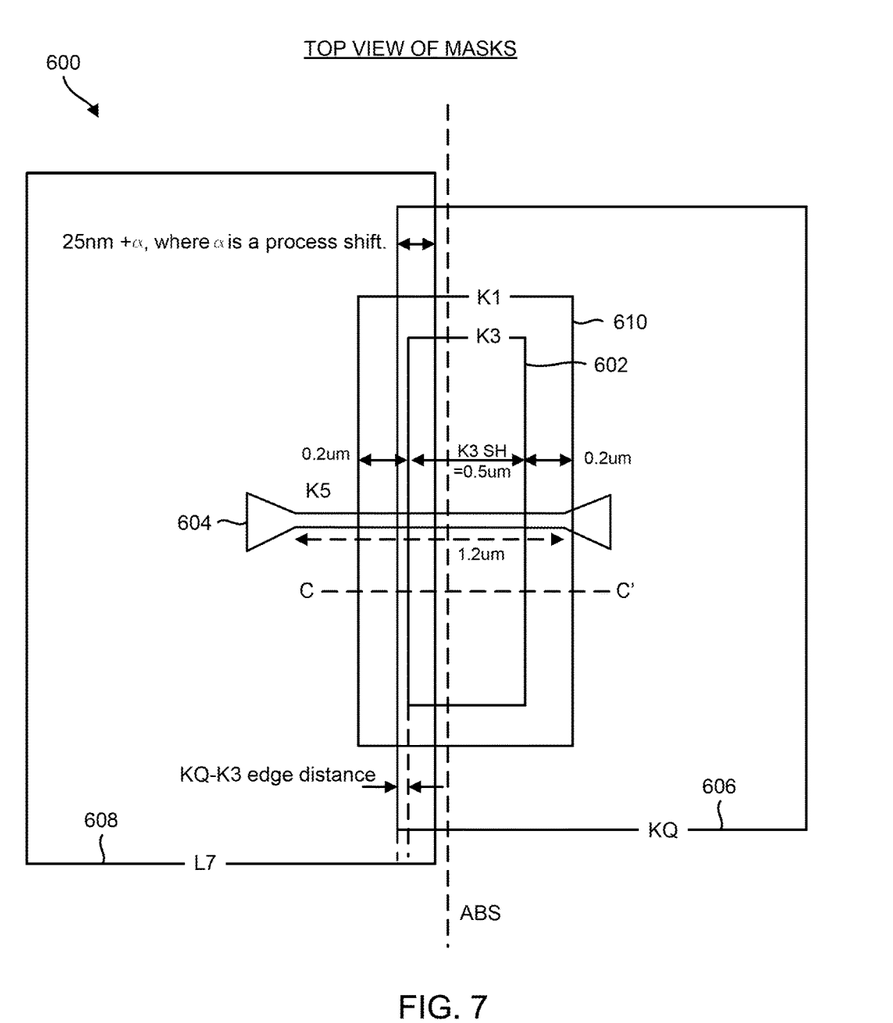
FIG. 7 is a top schematic view of various masking layers that may be used in a process for fabricating a magnetic sensor with effectively shaped side shields in accordance with one embodiment of the disclosure.

FIG. 7 is a top schematic view of various masking layers 600 that may be used in a process for fabricating a magnetic sensor with effectively shaped side shields in accordance with one embodiment of the disclosure. In one aspect, the various masking layers reflect the masking layers used in the fabrication processes of FIGS. 5a to 5k and FIG. 6 to form a magnetic sensor. The various masking layers 600 include a K3 masking layer 602, a K5 masking layer 604, a KQ masking layer 606, an L7 masking layer 608, and a K1 masking layer 610. In one aspect, the top view of the masking layers shown in FIG. 7 can be seen as illustrating the relative positioning and size of each of the masks.

The K3 masking layer 602 may be used to define a stripe height of the magnetic sensor. The K5 masking layer 604 may be used to define a track width of the magnetic sensor. The KQ masking layer 606 may be used to define a shape of the side shields of the magnetic sensor. The L7 masking layer 608 may be used to define a shape of an insulation layer of the magnetic sensor. The K1 masking layer 610 may be used to define a shape of a pinned layer of the magnetic sensor, and possibly to further define a shape of the side shields of the magnetic sensor.

FIG. 7 also shows an approximate positioning of the ABS and the distances between masks and the length of the K5 mask 604. These distances and dimensions are merely exemplary and may be varied in other embodiments.

Figure 8:
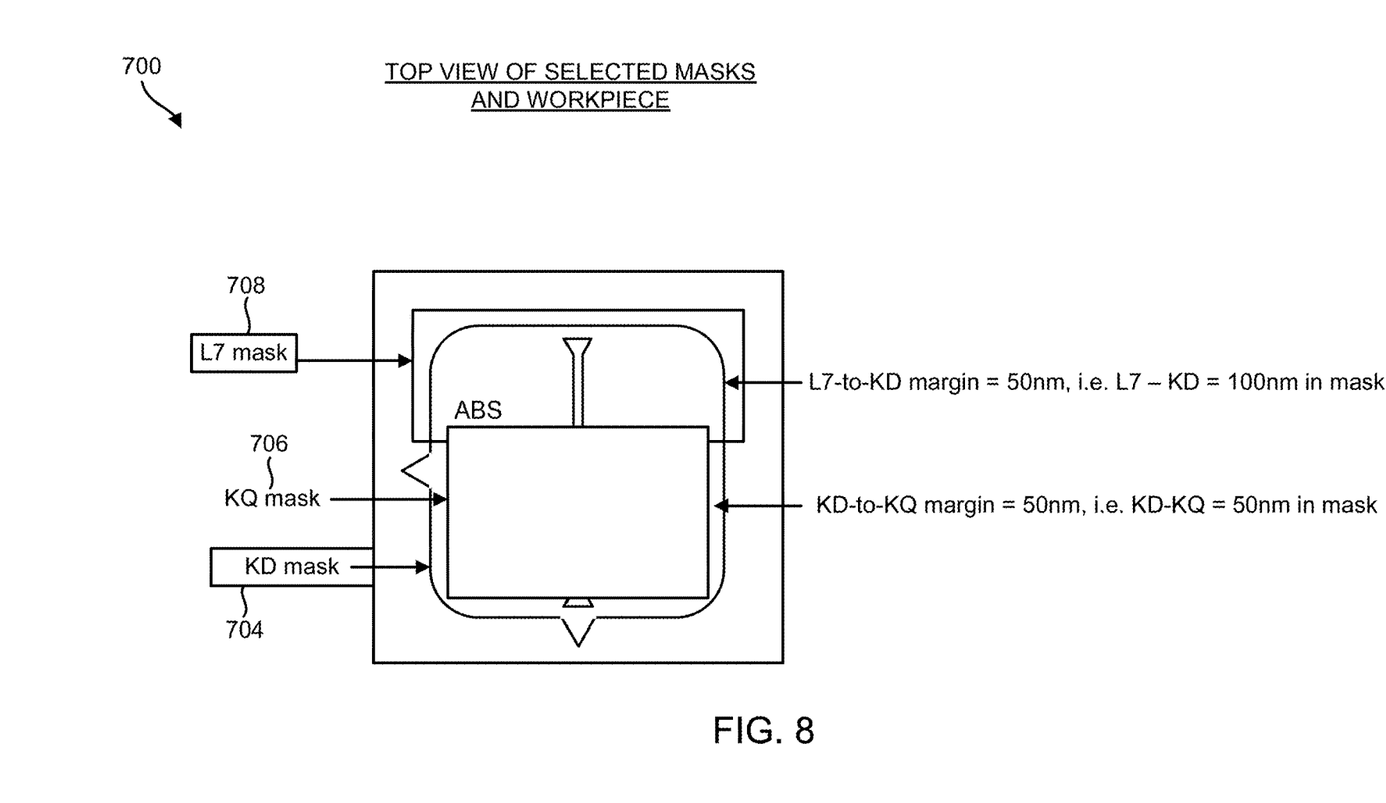
FIG. 8 is a top schematic view of various masking layers on a magnetic sensor workpiece that illustrate various constraints that may be used in a process for fabricating a magnetic sensor with effectively shaped side shields in accordance with one embodiment of the disclosure.

FIG. 8 is a top schematic view of various masking layers 700 on a magnetic sensor workpiece that illustrate various constraints that may be used in a process for fabricating a magnetic sensor with effectively shaped side shields in accordance with one embodiment of the disclosure. The various masking layers 700 include a KQ masking layer 706, an L7 masking layer 708, and a KD mask 704. The KD mask 704 may be viewed as a subcomponent of the K5 mask (e.g., see mask 460 in FIGS. 5e and 5f). In one aspect, the top view of the masking layers shown in FIG. 8 can be seen as illustrating the relative positioning and size of each of the masks.

As to the constraints, FIG. 8 shows that the margin for the L7 mask 708 to the KD mask 704 is about 50 nanometers (nm). Also, the KD mask 704 to KQ mask 706 is about 50 nm. In FIG. 7, the relative distance or margin from the KQ mask 606 to the K3 mask 602 can be between about 10 nm to about 40 nm. In one aspect, maintaining this margin can enable higher recording test amplitude and a minimal impact on servo head instability. In one aspect, any of these margins can have other suitable values such that the constraints are different.

In one aspect, and in addition to the constraints described above, the length measurement for KQ-L7 can be a parameter of interest. In one aspect, this parameter can be used for the sensor fabrication process to ensure that K5's pocket is filled by either insulation or side shield materials. If this parameter (KQ-L7) is smaller, CMP liftoff will be easier (e.g., provide better results/performance). If this parameter (KQ-L7) is larger, L7's insulation may be on top of KQ's side shield and the overall process might need longer CMP time for removal (e.g., CMP is less efficient).

In one aspect, and in addition to the constraints described above, the length measurement for KQ-K3 can be a parameter of interest. In one aspect, this parameter can be used for a sensor fabrication process to ensure KQ's side shield covers K3's back edge for stability but if the parameter (KQ-K3) gets too large, the design may start to lose the desired side shield shape anisotropy.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner. Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic sensor comprising:
   a substrate;
   a sensor stack, comprising a free layer and a pinned layer wherein a stripe height of the pinned layer is greater than a stripe height of the free layer, disposed on the substrate and having a stripe height defined by the stripe height of the free layer, wherein the sensor stack comprises:
   a front edge disposed at an air bearing surface (ABS) of the magnetic sensor;
   a back edge opposite of the front edge; and
   two side edges; and
   a side shield adjacent to each of the two side edges of the sensor stack, each side shield having a side shield height defined as a distance from the ABS to a back edge of the side shields;
   wherein the side shield height is greater than the stripe height, and
   wherein substantially no residue from materials used to form the side shield are disposed at the back edge of the sensor stack.

2. The magnetic sensor of claim 1, wherein the magnetic sensor is a subcomponent of a reader selected from the group consisting of an antiparallel free layer (AP FL) type reader, a two dimensional shape enhanced pinning (2D SEP) type reader, a reduced interlayer coupling (Hf) type reader, and a scissor rear soft bias (SB) type reader.

3. The magnetic sensor of claim 1, wherein the sensor stack comprises:
   the pinned layer on the substrate;
   a barrier layer on the pinned layer; and
   the free layer on the barrier layer.

4. The magnetic sensor of claim 1, further comprising an insulator layer on each of the side shields.

5. The magnetic sensor of claim 4, wherein the insulator layer comprises $TaO_x$, where x is a positive integer.

6. The magnetic sensor of claim 1, wherein each of the side shields comprises one or more materials selected from the group consisting of NiFe19, NiFe4, NiFe19/NiFe4, NiFe4/NiFe19, NiFe17Mo5, NiFe55, NiFe19/NiFeMo, NiFeMo/NiFe19, CoFe25, and combinations thereof.

7. A data storage device comprising the magnetic sensor of claim 1.

* * * * *